Patented May 8, 1934

1,958,327

UNITED STATES PATENT OFFICE 1,958,327

WATER-INSOLUBLE COLORED PRODUCTS FAST TO LIGHT, TO WATER, AND TO WEATHER

Rudolf Winkler, Basel, Switzerland, assignor to the firm Society of Chemical Industry in Basle, Basel, Switzerland No Drawing. Application August 10, 1929, Serial No. 385,088. In Switzerland August 21, 1928

2 Claims. (Cl. 260—27)

The present invention relates to water-insoluble colored products which are fast to light, to water, and to weather.

The manufacture of sparingly soluble pigments by interaction of a water-soluble dyestuff and a soluble salt of magnesium, an alkaline earth metal or a heavy metal is known.

By this invention dyestuffs which are sensitive to lime are precipitated by interaction with sparingly soluble compounds containing the said metals in a form capable of reaction. The metals which come here into question are those of the second and third group of the periodic system, particularly magnesium, calcium and aluminum. There are thereby produced water-insoluble products characterized by extraordinary stability to water, light and weather.

As dyestuffs there are particularly suitable poly-azo-dyestuffs containing at least one radical of a diazotized 1:8-aminonaphthol-sulfonic acid as so-called initial component. These dyestuffs correspond to the general formula

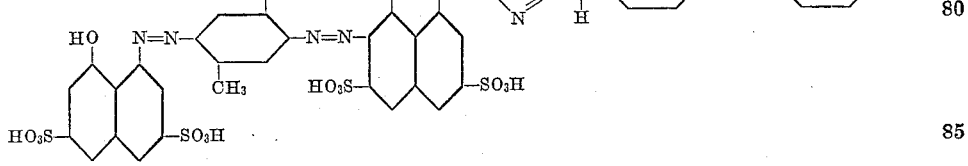

wherein the naphthalene nucleus carries at least one sulfonic group, and wherein the radical R consists of at least two aromatic nuclei of the benzene or naphthalene series, which nuclei are linked together by an azo-chromophore.

Among the precipitating agents having the above qualification there are suitable—oxides, carbonates, silicates or the like, and these not only in the form of artificial products but also in many instances in the form in which they occur in nature. Among such minerals or stones may be named marl, green earth, kaolin, clay, loam, calcium salts of zeolites, levigated chalk, magnesia usta, cements, or the like.

By the invention there has been solved the problem of coloring stone material in a manner which is simple and yields a color fast to light and weather; it suffices to brush, spray or impregnate the stone material with the dyestuff of the kind in question until the desired depth of color has been attained.

The invention is particularly valuable for, among other purposes, making stone pavings of fast color, colored gravel surfaces, colored brickwork, and for building purposes generally.

The following examples illustrate the invention:—

*Example 1*

200 kilos of one of the materials named above (for example marl) are treated with 2 kilos of the green dyeing cotton dyestuff of the formula

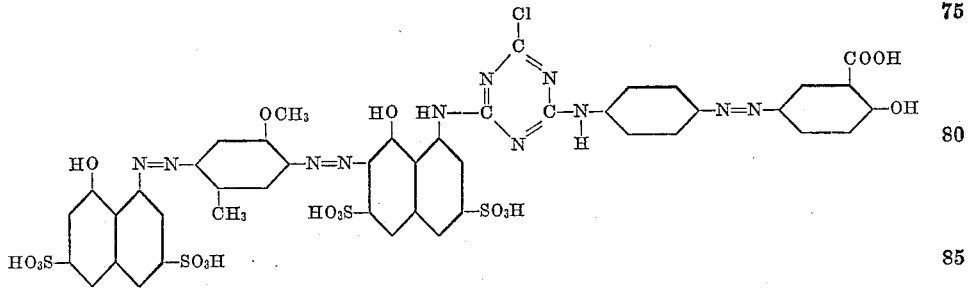

which are dissolved in 300 litres of hot water, and which dyestuff is obtained for example by uniting the diazotized mono-azo-dyestuff of the formula

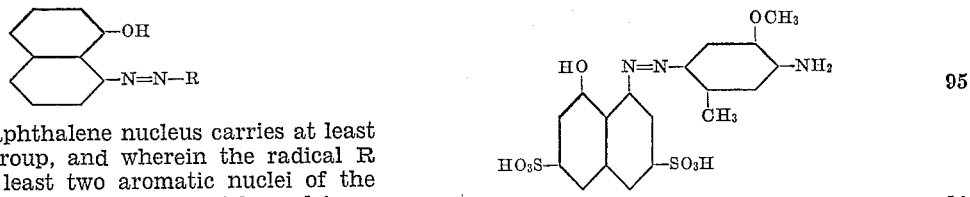

with the secondary condensation product from one molecular proportion of cyanuric chloride, one molecular proportion of the 1:8-aminonaphthol-3:6-disulfonic acid, and one molecular proportion of 4'-amino-4-hydroxyazobenzene-3-carboxylic acid. The whole is stirred, then filtered and washed. The filtrate as well as the washing waters are scarcely colored, while on the filter a green pigment is left.

A red pigment is obtained if the dyestuff of the preceding paragraph is replaced by the symmetrical urea of the formula

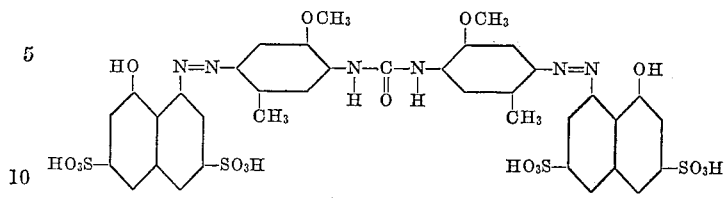

obtained from the mono-azo-dyestuff from diazotized 1:8-amino-naphthol-3:6-disulfonic acid and 1-methoxy-2-amino-4-methyl benzene.

*Example 2*

Fine gravel containing marl is for instance spread on a tennis court and watered with a solution containing 4 to 6 grams per litre of a suitable dyestuff, such as for instance the two dyestuffs named in the preceding example. The operation may be repeated at will one or several times, the dyestuff fixed on the marl dyeing the court green or red tints which are fast to light, water, and weather.

What I claim is:—

1. Water-insoluble colored products containing a polyazo-dyestuff of the formula

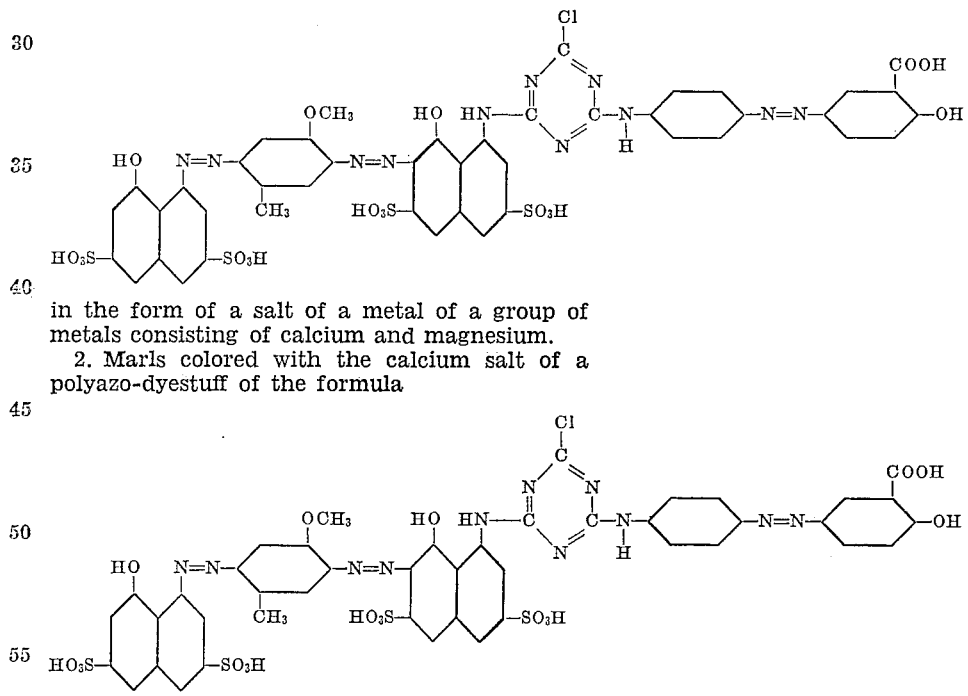

in the form of a salt of a metal of a group of metals consisting of calcium and magnesium.

2. Marls colored with the calcium salt of a polyazo-dyestuff of the formula

RUDOLF WINKLER.